United States Patent
Drewes

(10) Patent No.: US 10,663,022 B2
(45) Date of Patent: May 26, 2020

(54) BRAKE DRUM

(71) Applicant: SAF-HOLLAND GmbH, Bessenbach (DE)

(72) Inventor: Olaf Drewes, Aschaffenburg (DE)

(73) Assignee: SAF-HOLLAND GmbH, Bessenbach (DE)

( * ) Notice: Subject to any disclaimer, the term of this patent is extended or adjusted under 35 U.S.C. 154(b) by 156 days.

(21) Appl. No.: 15/739,795

(22) PCT Filed: Jun. 8, 2016

(86) PCT No.: PCT/EP2016/063016
§ 371 (c)(1),
(2) Date: Dec. 26, 2017

(87) PCT Pub. No.: WO2017/001157
PCT Pub. Date: Jan. 5, 2017

(65) Prior Publication Data
US 2018/0187731 A1    Jul. 5, 2018

(30) Foreign Application Priority Data
Jun. 29, 2015   (DE) .................. 10 2015 212 017

(51) Int. Cl.
*F16D 65/10* (2006.01)
*F16D 65/02* (2006.01)

(52) U.S. Cl.
CPC ...... *F16D 65/10* (2013.01); *F16D 2065/1304* (2013.01); *F16D 2065/1344* (2013.01); *F16D 2200/003* (2013.01); *F16D 2200/0047* (2013.01)

(58) Field of Classification Search
CPC ............... F16D 65/10; F16D 2065/132; F16D 2065/1316; B22D 13/04
USPC ... 188/74, 78, 218 A, 218 R, 251 A, 251 M; 192/107 M; 164/91, 98; 29/527.7, 529
See application file for complete search history.

(56) References Cited

U.S. PATENT DOCUMENTS

| | | | | |
|---|---|---|---|---|
| 2,061,769 A | * | 11/1936 | Hunt | C21D 9/00 148/650 |
| 2,493,173 A | | 1/1950 | Halteren | |
| 3,343,927 A | * | 9/1967 | Brede, III | B22F 3/26 188/218 A |
| 4,067,098 A | | 1/1978 | Blair, Jr. | |
| 5,782,324 A | | 7/1998 | Wall | |

(Continued)

FOREIGN PATENT DOCUMENTS

| | | |
|---|---|---|
| DE | 7121527 | 11/1971 |
| DE | 7913595 | 12/1979 |

(Continued)

OTHER PUBLICATIONS

European Patent Office; International Search Report; dated Aug. 31, 2016.

(Continued)

*Primary Examiner* — Christopher P Schwartz
(74) *Attorney, Agent, or Firm* — Price Henveld LLP

(57) ABSTRACT

A brake drum including a shell portion that has a friction face which is arranged with rotational symmetry with respect to an axis of rotation, and an attachment portion which has a mounting section, wherein the shell portion and the attachment portion are made of different materials and are connected to one another.

16 Claims, 3 Drawing Sheets

(56) References Cited

U.S. PATENT DOCUMENTS

| | | | |
|---|---|---|---|
| 6,051,045 A * | 4/2000 | Narula | C22C 1/05 |
| | | | 419/13 |
| 6,148,498 A | 11/2000 | Knauer | |
| 6,601,284 B1 * | 8/2003 | Wall | B22D 19/00 |
| | | | 29/527.5 |
| 7,216,746 B2 * | 5/2007 | Yamamoto | F16D 65/12 |
| | | | 188/218 R |
| 9,016,443 B2 * | 4/2015 | Zhang | F16D 65/10 |
| | | | 188/74 |
| 9,803,265 B2 * | 10/2017 | Wood | B28B 11/245 |
| 2004/0000386 A1 * | 1/2004 | Nakao | B22D 17/007 |
| | | | 164/91 |
| 2005/0167214 A1 | 8/2005 | Yamamoto et al. | |
| 2008/0217116 A1 | 9/2008 | Bonfanti et al. | |
| 2009/0056134 A1 | 3/2009 | Kleber et al. | |
| 2012/0080277 A1 | 4/2012 | Wood et al. | |

FOREIGN PATENT DOCUMENTS

| | | |
|---|---|---|
| DE | 102009032008 | 1/2011 |
| DE | 102011054484 | 4/2013 |
| FR | 2734195 | 11/1996 |
| GB | 502755 | 3/1939 |
| JP | 2011226530 | 11/2011 |
| WO | 9900607 | 1/1999 |
| WO | 2014160888 | 10/2014 |

OTHER PUBLICATIONS

Metallmatrix-Verbundwerkstoff. Aug. 5, 2014 https://de.wikipedia.org/w/index.php?title=Metallmatrix-Verbundwerkstoff=130205328.

\* cited by examiner

BRAKE DRUM

BACKGROUND OF THE INVENTION

The present invention relates to a brake drum, in particular a brake drum of a utility vehicle, which consists of a shell portion and an attachment portion.

Brake drums of the type in question are well known from the prior art. For example, there are brake drums that are made of an aluminum composite material, in which aluminum is die-cast around a porous ceramic core. However, such a system has the drawback that both the production of the ceramic core and the aluminum die-casting method are very energy-intensive and costly. Also known are brake drums in which ceramic particles are mixed with the molten aluminum alloy prior to casting. However, such systems have the drawback that the ceramic particles are not arranged in a targeted manner in the region of what is to be the wearing face, but rather are to be found distributed throughout the whole cast part. As a consequence, the highly stressed attachment portion, where the brake drum is attached to the vehicle, can experience material failure. Furthermore, it is not possible to use a high proportion of ceramic, the consequence of which is impaired wearing behavior.

The present invention therefore has the object of providing a brake drum, in particular for application in the field of utility vehicles, which has high resistance to wearing, guarantees a long service life and is simple and cost-effective to produce.

SUMMARY OF THE INVENTION

The invention provides a brake drum, in particular for a utility vehicle, comprising a shell portion that has a friction face which is arranged with rotational symmetry with respect to an axis of rotation, an attachment portion which has a mounting section, wherein the shell portion and the attachment portion are made of different materials and are connected to one another. The shell portion expediently has a friction face that is designed to be brought into contact with a brake lining of a brake shoe. Accordingly, the shell portion and in particular the friction face thereof must be made of particularly rigid and abrasion-resistant material. In order to ensure optimal braking behavior, the friction face is arranged rotationally symmetrically with respect to an axis of rotation that essentially corresponds to the axis of rotation of the vehicle axle. The shell portion is essentially cylindrical, with an end face of the shell portion expediently having a first connection section for connecting to the attachment portion. In order to be able to arrange or fix or mount the brake drum to or on the vehicle, the drum has an attachment portion with a mounting section that serves for fixing the brake drum to a part of the vehicle. In particular, the mounting section can be provided with holes or bolts in order to be able to arrange the brake drum on a wheel hub that rotates about the vehicle axle. The attachment portion expediently extends only slightly—if at all—into the cylindrical part of the shell portion, wherein "slightly" should in particular be understood as less than 0.1 times the extent of the shell portion along the axis of rotation. Of particular significance is the fact that the shell portion and the attachment portion are made of different materials and are connected to one another. In this context, different materials should be understood as meaning that the overall composition of the shell portion and the attachment portion are different. This makes it entirely possible for the shell portion to be made of a composite material consisting of aluminum and another certain first element, while the attachment portion is made of an alloy of aluminum and another second element. Making the shell portion and the attachment portion out of different materials thus makes it possible to guarantee that the respective region has those materials which particularly satisfy the required properties. Therefore, the shell portion can be provided with a material that is particularly abrasion- and heat-resistant, while the attachment portion can be provided with a material that is able to absorb particularly high forces. In order to form the brake drum according to the invention, the shell portion and the attachment portion are connected to one another. In this context, the connection can be reversible, or irreversible by means of a material bond. In this context, the term "irreversible" should be understood as meaning that the shell portion and the attachment portion can be separated only by destroying the brake drum.

Preferably, the shell portion and the attachment portion are produced separately from one another. In other words, the shell portion and the attachment portion are produced separately, or in isolation, before being connected to one another. This makes it particularly advantageously possible to permit a type of building block system in which a large number of variants of shell portions and another large number of variants of attachment portions can be produced separately from one another and then connected to one another as required. Particularly advantageously, both the shell portion and the attachment portion can be produced by means of a primary forming process, for example by casting. Thus, when produced separately from one another, the shell portion and the attachment portion do not form a single part during the production process but rather are mutually separate parts that are connected to one another only in a subsequent method step.

Advantageously, the shell portion is made at least partially and preferably entirely of a metal matrix composite material, in particular an aluminum-ceramic composite material. Thus, in particular that part of the shell portion that contains the friction face can be made of a metal matrix composite material, while the opposite, generally outward-oriented part or face of the shell portion can be made only of metal and need not contain a composite material. However, the entire shell portion is particularly preferably made entirely of a metal matrix composite material, so that the shell portion is predominantly, in particular as much as above 90%, and particularly preferably entirely made of a metal matrix composite. In this context, the metal advantageously forms a coherent matrix wherein for example the ceramic forms a reinforcing phase. Ceramic particles of this kind can for example be silicon carbide. The composite material used can equally be carbon-based short or endless fibers, or open-cell foams.

In a particularly preferred embodiment, the shell portion is made at least partially and preferably entirely of a material that consists of a discontinuous phase, preferably ceramic particles, and a continuous phase, preferably aluminum. Thus, the discontinuous phase forms the reinforcing phase and consists in particular of loose ceramic particles or carbon particles or carbon fibers. These are particularly expediently introduced into a metal melt, for example of aluminum or titanium. This permits a particularly advantageously homogeneous distribution of the discontinuous phase, in particular of the ceramic particles, which leads to particularly operationally reliable product properties.

Expediently, the volumetric percentage ratio of ceramic particles to aluminum is in the range from 0.4 to 4, preferably 1 to 4 and particularly preferably 1.5 to 4. This allows an improvement in the wearing behavior and thus an extension of the service life of the brake drum. This is in particular the case in comparison to brake drums having ceramic particles that are cast in one piece, as known from the prior art, in which, owing to the attachment portion also being cast as part of the one piece, the ceramic fraction is very much lower. It is particularly expedient for the shell portion adjacent to the friction face to have a volumetric percentage ratio of ceramic particles to aluminum in the range from 2.8 to 4, which decreases radially (i.e. perpendicular to the axis of rotation) and is in the range from 2.8 to 4 adjacent to the outer side opposite the friction face.

Preferably, the attachment portion is made at least partially and preferably entirely of a homogeneous material, preferably aluminum, steel or an alloy. Thus, the attachment portion can be made partly, in particular in the region of the mounting section, preferably predominantly and more preferably in a proportion of at least 90% and especially preferably entirely of a homogeneous material. In particular, when the attachment portion is made entirely out of a homogeneous material, it is particularly cost-effective to produce and has particularly durable product properties. In this context, "homogeneous" means that the attachment portion is made of a material having the same composition. Thus, the attachment portion can be made of a metal such as aluminum, steel or an alloy thereof. Alternatively, the attachment portion can also be made of plastic or a fiber composite material.

Preferably, the shell portion has a first connection section and the attachment portion has a second connection region via which the shell portion and the attachment portion are connected to one another in a force-fitting and/or form-fitting and/or materially bonded manner. The connection sections thus represent, in particular, the contact sections between the attachment portion and the shell portion. In this context, the shell portion and the attachment portion can be connected by means of a force-fit and/or a form-fit and/or a material bond. A materially bonded connection leads to particularly high operational reliability while a force-fitting and form-fitting connection can advantageously also be designed to be reversible so that, for example, once the shell portion has become worn it can be replaced with a new shell portion and the attachment portion can continue to be used.

Expediently, the first and second connection sections are connected to one another in a materially bonded manner by means of a weld. Particularly advantageously, the materially bonded connection is produced by means of a friction welding process, in particular a friction stir welding process. It is however also conceivable to provide other types of welded or soldered connections.

Also expediently, the first and second connection sections are connected to one another in a force-fitting and form-fitting manner, in particular by means of connection means. In this context, the connection means can be provided as separate elements, for example screws or bolts, so that for example in the attachment portion there are provided a plurality of holes through which screws can pass, for which screws there are arranged in the shell portion cutouts provided with a thread, into which cutouts the screws can engage. It is also possible to press the connection sections together. In that context, the attachment portion can for example be thermally heated while the shell portion is cooled so that these can be inserted one inside the other and engage in a press fit with one another once temperatures have equalized. It is also possible for an undercut to be provided on the attachment portion and/or the shell portion, in the respective connection sections, so as to establish a force- and form-fitting connection.

Preferably, the first connection section has a first connection face and the second connection section has a second connection face, wherein the connection faces are preferably made so as to be essentially congruent with respect to one another. Thus, the connection faces expediently represent the contact faces between the shell portion and the attachment portion. In particular in the case of a form-fitting connection, the connection faces are designed to be essentially parallel to or congruent with or to fit with one another. In particular in the case of a materially bonded connection, the connection faces need not be congruent or aligned with one another, but rather can even be inclined with respect to one another such that they form a gap, for example a V-shaped gap, between them, which gap can be filled with a welding material.

In a preferred embodiment, the connection faces extend perpendicular and/or parallel and/or at an angle to the axis of rotation. The connection faces are then at an angle to the axis of rotation if they extend at an angle not equal to 0° or 90° to the axis of rotation. Forming the connection faces at an angle is preferred in particular in the case of a welded connection. The same is true for arranging the connection faces perpendicular to the axis of rotation since this allows them to be connected to one another particularly well by means of a friction welding process. In the case of a force- and form-fitting connection between the first and second connection sections, a particularly advantageous configuration of the connection faces has been found to be one in which the connection faces form the shape of a step or an undercut and thus are formed not only perpendicular or parallel or at an angle to the axis of rotation, but rather bring together a combination of the previously mentioned orientations.

Advantageously, the ratio of the extent of the attachment portion to that of the shell portion along the axis of rotation is between 0.05 and 0.6, preferably between 0.1 and 0.5 and particularly preferably between 0.17 and 0.4. In the case of steep attachment portions, that is to say in the case of attachment portions that have a small inclination to the normal of the axis of rotation, a ratio in the lower range of 0.05 to 0.2 has been found to be particularly advantageous. In the case of very shallow attachment portions, that is to say attachment portions whose inclination to the normal of the axis of rotation is greater than 25°, a ratio in the upper range of 0.4 to 0.6 has been found to be particularly advantageous. A particularly advantageous position for the connection region between the attachment portion and the shell portion has been found to be in a ratio between 0.1 and 0.5 since this provides a good balance between bending moments and torsion moments acting on the connection point between the attachment portion and the shell portion, without unnecessarily limiting the breadth of the friction faces (that is to say the extent of the friction face along the axis of rotation).

BRIEF DESCRIPTION OF THE DRAWINGS

Further features and properties of the present invention will emerge from the following description of preferred embodiments, with reference to the appended figures, in which.

DETAILED DESCRIPTION OF THE PREFERRED EMBODIMENTS

Figure 1:
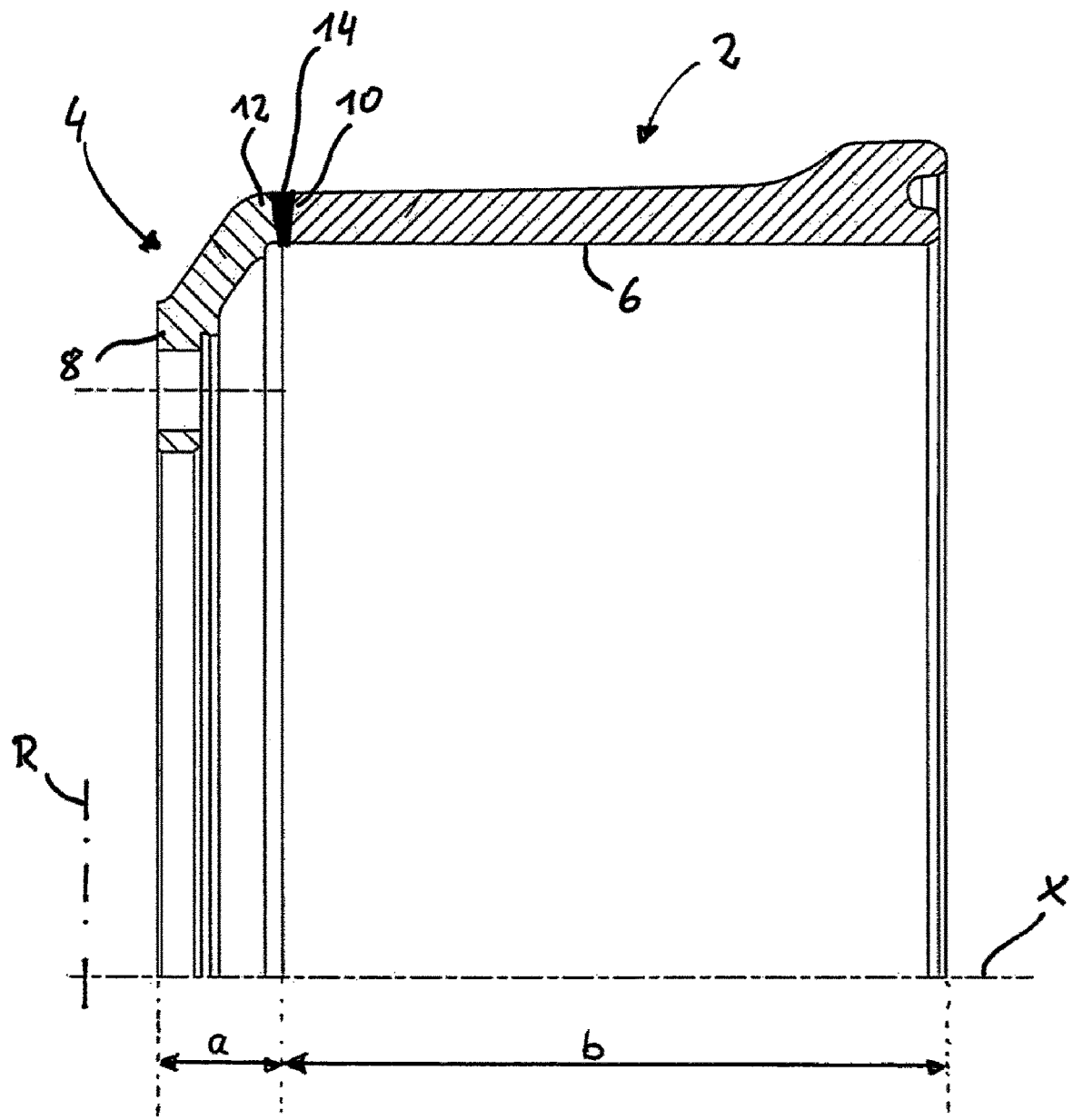
FIG. 1 shows a section view through part of a preferred embodiment of the brake drum according to the invention.

FIG. 1 shows a transverse section view through part of a first preferred embodiment of the brake drum according to the invention. This drum consists of a shell portion 2 and an attachment portion 4. The shell portion 2 and the attachment portion 4 are made of different materials and are originally produced separately from one another. In order to form the brake drum according to the invention, the shell portion 2 and the attachment portion 4 are connected to one another.

The shell portion 2 has a friction face 6 that is configured to engage with a brake lining (not shown). To that end, the friction face 6 is arranged with rotational symmetry around the axis of rotation x.

The attachment portion 4 has a mounting section 8 for the purpose of securing the brake drum to a vehicle part, in particular a wheel hub rotating on the vehicle axle. In this context, the mounting section 8 can have through-holes for securing wheel bolts.

In order to connect the shell portion 2 and the attachment portion 4 to one another, the shell portion 2 has a first connection section 10 and the attachment portion 4 has a second connection section 12. These comprise corresponding connection faces which, in the embodiment shown, are inclined with respect to one another and thus form a V-shaped gap which is intended for welding 14 the shell portion 2 and the attachment portion 4.

It has been found to be expedient for the ratio of the extent a of the attachment portion to the extent b of the shell portion, along the axis of rotation x, to be between 0.05 and 0.6.

Figure 2A:
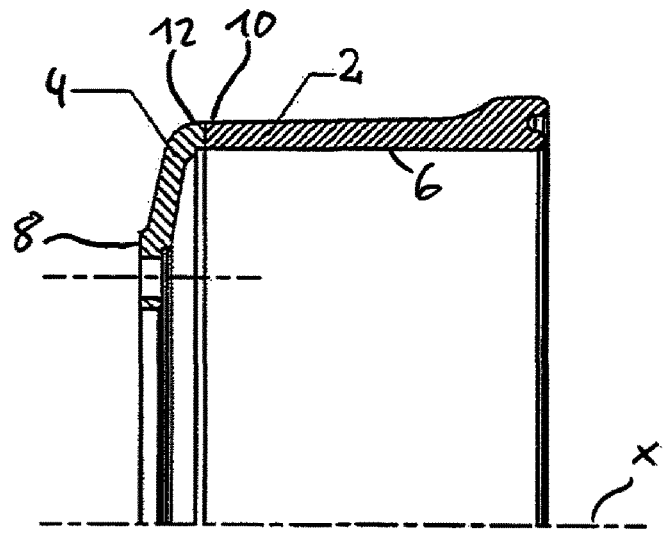
FIGS. 2A-2C shows section views through parts of three different preferred embodiments of the brake drum according to the invention.
Figure 2B:
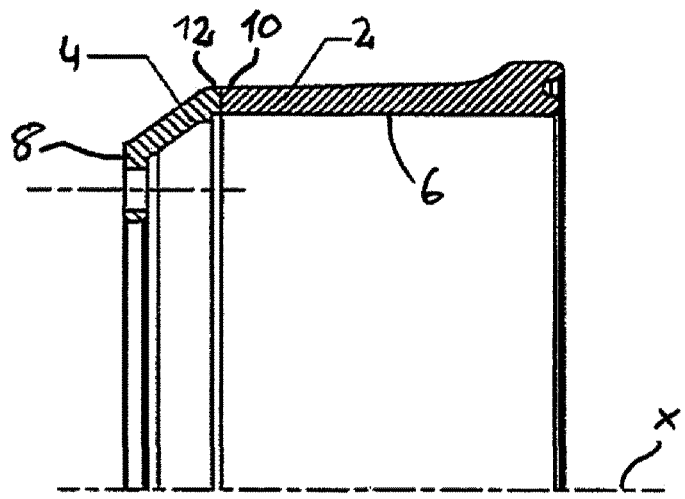
Figure 2C:
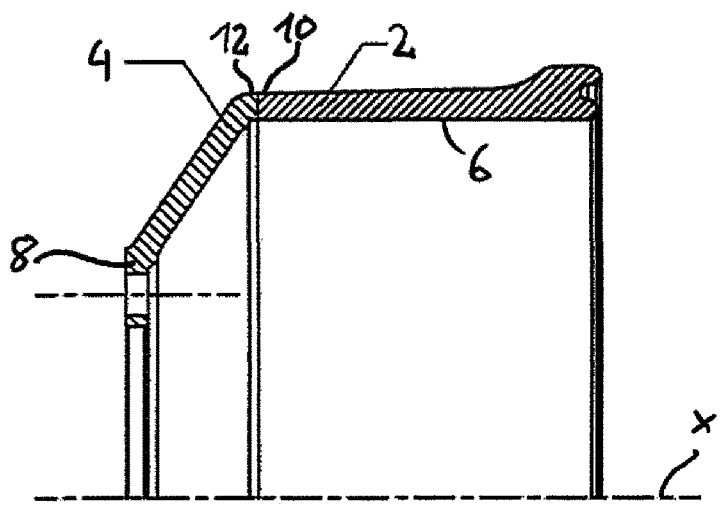

By virtue of the fact that the shell portion 2 and the attachment portion 4 are produced separately from one another and are then connected to one another, it is possible to provide a large number of different shell portions 2 and a large number of different attachment portions 4, and to fit these together in the manner of a building block system, as shown in FIGS. 2A-2C. The figure shows that two different attachment portions 4 are provided on identical shell portions. The upper brake drum of FIG. 2 shows a very steep attachment portion 4 while the middle brake drum of FIG. 2 shows a very shallow attachment portion 4. The ability to arrange different attachment portions 4 on identical shell portions 2 advantageously makes it possible to provide a brake drum system in which, independently of the shell portion 2, the brake drum can be adapted to different interfaces, by in each case affixing the appropriate attachment portion 4 to the shell portion 2.

Figure 3:
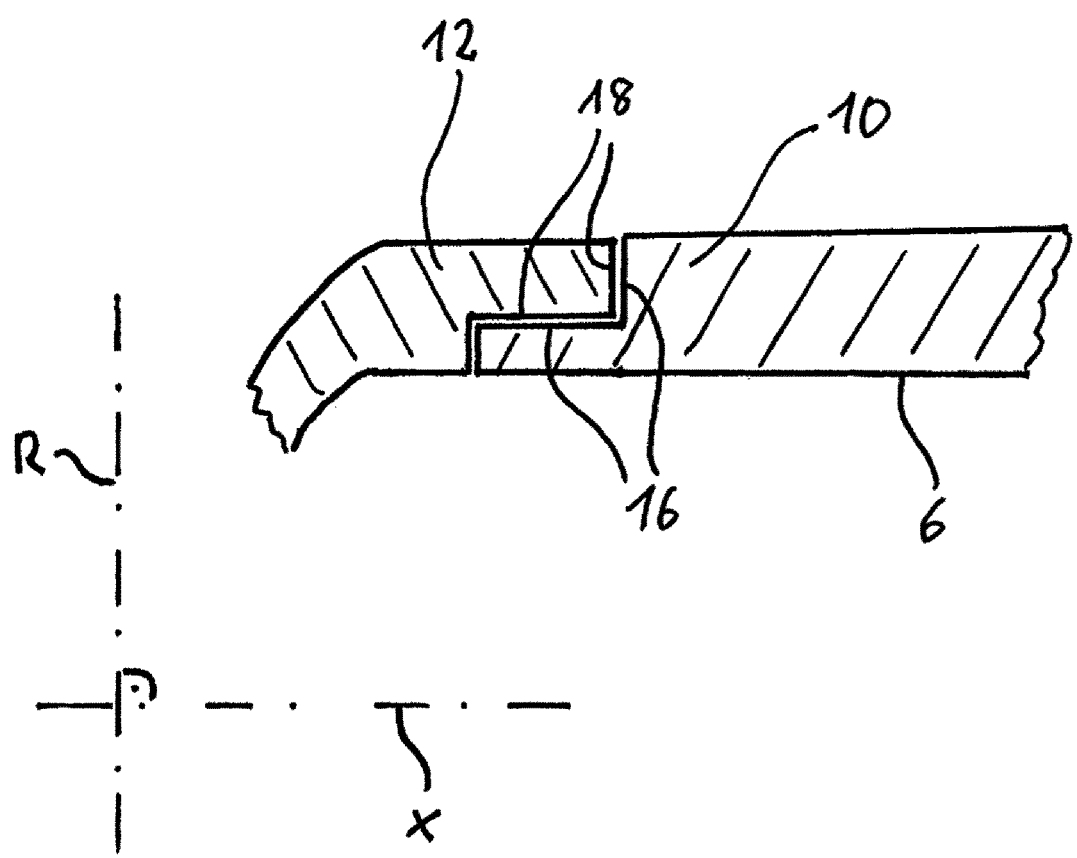
FIG. 3 shows a section view through part of another preferred embodiment of the brake drum according to the invention.

FIG. 3 shows a section view through a connection region of the shell portion 2 and the attachment portion 4 of a preferred embodiment of the brake drum. The shell portion 2 has, in its first connection section 10, first connection faces 16. Accordingly, the attachment portion 4 has, in its second connection section 12, second connection faces 18. In this context, the connection sections 10, 12 are configured so as to form a step, in that the connection faces 16, 18 have a region extending parallel to the axis of rotation x and a region extending perpendicular to the axis of rotation x. In this context, it is particularly advantageous if—as seen in a radial direction R—the first connection section 10 of the second shell portion 2 is located at least partially inside the second connection section 12 of the attachment portion 4, since the shell portion 2 experiences greater heating when the brake drum is actuated, and therefore the shell portion 2 tends to expand, thus further strengthening the connection between the shell portion 2 and the attachment portion 4.

Furthermore, it is particularly advantageous if the connection faces 16, 18 form an undercut with respect to one another in the circumferential direction of the brake drum, so as to prevent rotation of the second shell portion 2 with respect to the attachment portion 4. An undercut of this kind is possible for example by forming a toothing or a wave profile on the connection faces 16, 18.

LIST OF REFERENCE SIGNS

2 Shell portion
4 Attachment portion
6 Friction face
8 Mounting section
10 First connection section
12 Second connection section
14 Weld
16 First connection face
18 Second connection face
a, b Extent
R Radial direction
x Axis of rotation

The invention claimed is:

1. A brake drum for a utility vehicle, comprising:
a shell portion that has a friction face which is arranged with rotational symmetry with respect to an axis of rotation, wherein the shell portion at least partially comprises an aluminum-ceramic composite material, and wherein a volumetric percentage ratio of ceramic particles to aluminum is in the range from 1.5 to 4; and
an attachment portion which has a mounting section, wherein the shell portion and the attachment portion are made of different materials and are connected to one another, the shell portion and the attachment portion are separate pieces, the shell portion has a first connection section and the attachment portion has a second connection section, and wherein the first and second connection sections are connected to one another in a materially bonded manner by a weld.

2. The brake drum as claimed in claim 1, wherein the shell portion at least partially comprises a material that consists of a discontinuous phase and a continuous phase.

3. The brake drum as claimed in claim 2, wherein the shell portion is entirely the material that consists of the discontinuous phase and the continuous phase.

4. The brake drum as claimed in claim 2, the discontinuous phase of the material includes ceramic particles, and the continuous phase of the material includes aluminum.

5. The brake drum as claimed in claim 1, wherein the shell portion has the first connection section and the attachment portion has the second connection section via which the shell portion and the attachment portion are at least one of force-fit and form-fit connected.

6. The brake drum as claimed in claim 5, wherein the first and second connection sections are connected to one another by connection arrangement.

7. The brake drum as claimed in claim 5, wherein the first connection section has a first connection face and the second connection section has a second connection face, wherein the connection faces are configured as to be congruent with respect to one another.

8. The brake drum as claimed in claim 7, wherein the connection faces extend perpendicular, parallel and/or at an angle to the axis of rotation.

9. The brake drum as claimed in claim 1, wherein a ratio of an extent of the attachment portion to an extent of the shell portion along the axis of rotation is between 0.05 and 0.6.

10. The brake drum as defined in claim 9, wherein the ratio is between 0.1 and 0.5.

11. The brake drum as defined in claim 10, wherein the ratio is between 0.17 and 0.4.

12. The brake drum as claimed in claim 1, wherein the composite material of the shell portion at least partially comprises a metal matrix composite material.

13. The brake drum as claimed in claim 12, wherein the shell portion is entirely the metal matrix composite material.

14. The brake drum as claimed in claim 1, wherein the attachment portion comprises a homogeneous material.

15. The brake drum as defined in claim 14, wherein the homogeneous material includes one of aluminum, steel and an alloy.

16. The brake drum as claimed in claim 1, wherein the composite material consists of a discontinuous phase.

* * * * *